William C. Aycock INVENTOR.

BY [signature]

ATTORNEY

United States Patent Office 3,354,647
Patented Nov. 28, 1967

3,354,647
METHOD FOR INITIATING OR QUENCHING THE COMBUSTION IN A SOLID PROPELLANT ROCKET MOTOR
William C. Aycock, Huntsville, Ala., assignor to Thiokol Chemical Corporation, Bristol, Pa., a corporation of Delaware
Filed Oct. 22, 1965, Ser. No. 500,498
2 Claims. (Cl. 60—220)

ABSTRACT OF THE DISCLOSURE

A method of initiating or quenching combustion in a rocket motor having zones of solid propellant therein separated by a barrier and a pressurized tank containing a liquid burning initiator or a quenching medium whereby when either of these two liquids are ejected onto the barrier the burning thereof will be enhanced or quenched.

Figures 1, 2:
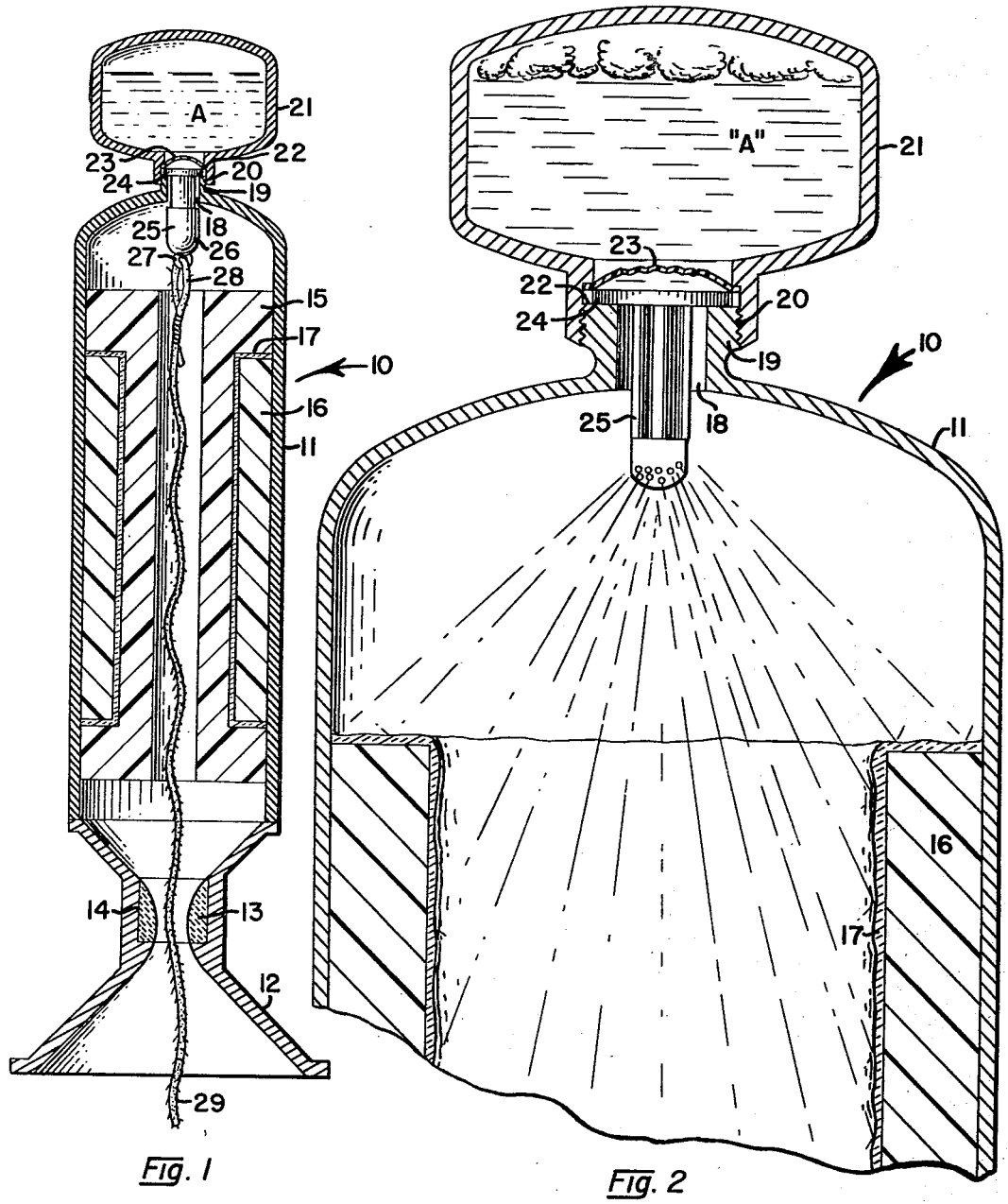

This invention relates to improvements in a method and apparatus for controlling the operation of a solid propellant rocket motor and more particularly to an apparatus that will either enhance or quench the burning of a zoned rocket motor.

It has been determined that the operation of a solid propellant rocket motor can be controlled by casting or otherwise placing in a rocket motor, layers or zones of solid propellant that are separated by a barrier that will affect the ignition and burning of the layer or zone of solid propellant that is located in the rocket motor behind such barrier.

At the present time there are several types of rocket motors that are used in the combat area, either ground to ground defense rocket motors or ground to air in the case of low flying aircraft. In order to provide the most efficient results that are obtained by the use of such rocket motors, it is necessary to be aware of the range of the target which is to be reached by the rocket motor.

If the maximum range of a rocket motor is known then the ability to control the rocket motor, so that it attains full range or a partial or intermediate range, is an important feature that is extremely useful in the combat area.

The present invention, therefore, has for an important object thereof the provision of an apparatus that will control the operation of a rocket motor so that it can be caused to operate over a full or a partial or intermediate range.

This is achieved by positioning on a rocket motor at any suitable place thereon, a tank that may contain a fluid that will enhance the burning of the solid propellant to provide full range of the rocket motor or quench the burning of the solid propellant to provide a partial or intermediate range for the rocket motor.

Another object of the invention is to provide an apparatus that is preset before the rocket motor is ignited so that the range to be achieved by the rocket motor is predetermined before it is placed in operation.

With the above and other objects and advantages in view, the invention consists of the novel details of construction, arrangement and combination of parts more fully hereinafter described, claimed and illustrated in the accompanying drawing, in which:

FIGURE 1 is a longitudinal sectional view of a rocket motor with an embodiment of the present invention incorporated therewith; and FIGURE 2 is an enlarged fragmentary sectional view, partly in elevation, illustrating the mode of operation of the present invention.

Referring more in detail to the drawing, wherein like parts are designated by like reference numerals, the reference numeral 10 is used to designate a rocket motor.

The rocket motor 10 comprises a motor case 11 having at the aft end thereto an exit cone or nozzle 12 connected thereto in any well-known conventional manner, as is the usual practice a heat resistant throat insert 13 is positioned in the throat 14 of the exit cone or nozzle 12.

Cast or otherwise positioned in the motor case 11 are two concentric layers or zones 15 and 16 of solid propellant which are separated by a barrier 17.

The head end of the motor case 11 is provided with an opening 18 which is defined by an integral externally threaded flange 19 to which is threadably connected an internally threaded neck portion 20 of a tank or reservoir 21.

The flange 19, adjacent to the termination of the threads therein, is provided with an annular seat or groove 22 in which is positioned a circular burst diaphragm 23 and an annular flange 24 of a spray nozzle 25.

The burst diaphragm 23 is positioned within the flange 19 so that it effectively blocks communication between the spray nozzle 25 and the tank 21.

In the operation of the embodiment of the invention a liquid A is poured into the tank 21. The liquid A may be an oxidative reactant that will enhance the burning of the barrier 17 or it may be a quenchable medium that will prevent burning of the barrier 17.

The nature of the liquid A depending upon the range that is required of the rocket motor 10 to reach its selected target.

The burst diaphragm 23 is placed in position in the seats 22 of the throat 20 of the tank 21 and will prevent the liquid A therein from escaping into the motor case 11. The flange 24 of the nozzle 25 is then inserted into the flange 19 of the motor case 11 and the threads of the flange 19 and throat 20 are interconnected, as shown in the figures.

However, to carry out the invention as desired, it is necessary to close the spray openings of the spray nozzle 25 with a closure cap or cup 26. The cap or cup 26 is provided with an eye 27 to which is connected a loop 28 in a lanyard or rope 29. The end of the lanyard or rope 29 will extend outwardly of the aft end of the exit cone or nozzle 12, as shown in FIGURE 1.

The desired range of the rocket motor 10 is determined and a tank 21 having an oxidative reactant liquid A is used or a tank 21 having a quenching medium liquid A is used.

Prior to the ignition of the layer 15 of solid propellant, the lanyard or rope 29 is pulled, removing the cap or cup 26 from the spray nozzle 25 and the rocket motor is ready to achieve its precalculated range of operation.

The tank 21 is not completely filled with the liquid A so that there is a certain amount of free volume of air therein which may be proportioned as required to provide proper pressurized gas capacity, thus as the pressure created by the combustion gases of the solid propellant as it burns, enters the spray openings in the nozzle 25, such pressure will burst the diaphragm 23 and enter the tank 21 and pressurize the liquid A. As long as this pressure is equalized with the pressure of the combustion gases in the motor case 11, the liquid A will remain in the tank 21, but as soon as the pressure within the motor case 11 drops, such as by the burning propellant 15 reaching the barrier 17, the pressurized liquid A will be ejected through the spray openings of the nozzle 25 to either enhance the burning of the barrier 17 or completely quench the burning of the solid propellant within the motor case 11.

Thus, with either a quenchable liquid or with a liquid that is an oxidant reactant, either a full duration or a short duration operation can be achieved.

In the event a reactive oxidant liquid is used in conjunction with a complete barrier, and if full duration is desired, the cap is extracted prior to the ignition of the rocket motor by means of the lanyard, or rope. The removal of the cap will allow pressurization of the tank, upon ignition of the rocket motor, such pressurization will cause expulsion of the reactive liquid as the chamber pressure drops i.e. when burning has proceeded to the barrier. In the event only a partial duration is desired, the cap is allowed to remain on the spray nozzle to prevent any pressurization of the fluid in the tank.

In the event a quenching liquid is used, full duration of operation is achieved by allowing the cap to remain on the spray nozzle. As the burning progresses to an incomplete barrier, a momentary pressure drop is experienced, but full operation is resumed after the incomplete barrier has been consumed by the heat from the propellant adjacent to it. In the event a partial duration operation is desired, the cap is extracted prior to ignition by means of the lanyard or rope. In this mode of operation, when the momentary pressure drop is experienced as burning progresses to the incomplete barrier, the pressure differential between the tank and the rocket motor combustion chamber is sufficient to cause a spray of the quenching liquid, which is sufficient to terminate combustion in that portion of the propellant which is exposed to the spray of the quenching liquid.

Thus the range of the rocket motor 10 can be controlled by the type of liquid A that is in the tank 21.

The operation of the rocket motor depends entirely on the form of the liquid A that is used, thus the apparatus is identical in either operation and depends entirely on the range capability of the rocket motor 10.

It is believed that the mode of operation of the invention, as well as the construction thereof will be apparent to those skilled in the art and it is to be understood that variations in the mode of operation and construction thereof may be adhered to provided such alterations fall within the spirit of the invention and the scope of the appended claims.

Having thus described the invention what is claimed as new and desired to be secured by Letters Patent is:

1. A method of initiating combustion in a rocket motor having zones of solid propellant therein separated by a barrier and a partially filled tank containing a liquid oxidative reactant comprising the steps of providing a pressure rupturable closure for the tank, igniting one of the zones of solid propellant causing a portion of the gas stream created by the burning of the solid propellant to impinge upon and rupture said closure and thereafter enter said tank to pressurize said liquid oxidative reactant for injection onto the barrier during a pressure drop in a burning solid propellant zone for enhancing the burning thereof and the ignition of the unburned zone of solid propellant immediately adjacent the barrier.

2. A method of quenching combustion in a rocket motor having zones of solid propellant therein separated by a barrier and a partially filled tank containing a liquid quenching medium comprising the steps of providing a pressure rupturable closure for the tank, igniting one of the zones of solid propellant causing a portion of the gas stream created by the burning of the solid propellant to impinge upon and rupture said closure and thereafter enter said tank to pressurize said liquid quenching medium for injection onto the barrier during a pressure drop in a burning solid propellant zone for quenching the burning thereof to prevent ignition of the unburned zone of solid propellant immediately adjacent the barrier.

References Cited

UNITED STATES PATENTS

| | | | |
|---|---|---|---|
| 2,671,312 | 3/1954 | Roy | 60—251 X |
| 2,880,582 | 4/1959 | Turansky et al. | 60—39.48 |
| 2,949,009 | 8/1960 | D'Ooge | 60—254 |
| 3,084,506 | 4/1963 | Floyd et al. | 60—254 X |
| 3,115,007 | 12/1963 | Fox | 60—251 |
| 3,283,510 | 11/1966 | Mangum et al. | 60—251 X |

CARLTON R. CROYLE, *Primary Examiner.*